United States Patent
Ueno

(10) Patent No.: US 9,952,245 B2
(45) Date of Patent: Apr. 24, 2018

(54) VELOCITY DEVIATION MEASURING DEVICE AND METHOD

(71) Applicant: Azbil Corporation, Tokyo (JP)

(72) Inventor: Tatsuya Ueno, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 424 days.

(21) Appl. No.: 14/790,742

(22) Filed: Jul. 2, 2015

(65) Prior Publication Data
US 2016/0003862 A1    Jan. 7, 2016

(30) Foreign Application Priority Data
Jul. 3, 2014   (JP) .................................. 2014-137380

(51) Int. Cl.
   *G01P 3/36*   (2006.01)
   *G01S 17/58*  (2006.01)
   (Continued)

(52) U.S. Cl.
   CPC .............. *G01P 3/36* (2013.01); *G01S 7/4916* (2013.01); *G01S 17/58* (2013.01); *G01S 17/325* (2013.01)

(58) Field of Classification Search
   CPC ...... G01S 17/58; G01S 17/325; G01S 7/4916; G01P 3/36
   (Continued)

(56) References Cited

U.S. PATENT DOCUMENTS 7,911,593 B2 *  3/2011  Ueno ................... G01B 11/026
                                                356/28
7,961,302 B2 *  6/2011  Ueno ..................... G01S 7/4808
                                                356/28
(Continued)

FOREIGN PATENT DOCUMENTS

CN    101988851 A    3/2011
CN    102375143 A    3/2012
(Continued)

OTHER PUBLICATIONS

Chinese Office Action dated Mar. 15, 2017 issued in Chinese Application No. 201510378485.2.

*Primary Examiner* — Mark Hellner
(74) *Attorney, Agent, or Firm* — Oblon, McClelland, Maier & Neustadt, L.L.P.

(57) ABSTRACT

A velocity deviation measuring device includes: a laser driver that causes a semiconductor laser to oscillate; a counting portion that counts run lengths of binary signals wherein interference waveforms included in the output of a photodiode that converts the output of the semiconductor laser into an electric signal have been binarized; and a calculating portion that calculates the deviation in the surface velocity of a web from the counting result by the counting portion. The counting portion binarizes the interference waveform synchronized to a sampling clock, measures the respective run lengths of the binary signal during a reference interval and a comparison interval, creates respective frequency distributions of the run lengths for the reference interval and the comparison interval, and calculates, respectively, for the reference interval and the comparison interval, the total numbers of run lengths that are at or above a threshold value Th, from the frequency distribution.

8 Claims, 18 Drawing Sheets

(51) Int. Cl.
*G01S 7/491* (2006.01)
*G01S 17/32* (2006.01)
(58) Field of Classification Search
USPC .......................................................... 356/28
See application file for complete search history.

(56) References Cited

U.S. PATENT DOCUMENTS

| | | |
|---|---|---|
| 8,446,574 B2 | 5/2013 | Ueno |
| 8,494,796 B2 | 7/2013 | Ueno |
| 2011/0032959 A1 | 2/2011 | Ueno |
| 2011/0164243 A1 | 7/2011 | Ueno |
| 2012/0010858 A1 | 1/2012 | Ueno |
| 2013/0033696 A1 | 2/2013 | Ueno |

FOREIGN PATENT DOCUMENTS

| | | |
|---|---|---|
| CN | 102792183 A | 11/2012 |
| JP | 2011-033525 A | 2/2011 |
| JP | 2011-141128 A | 7/2011 |

\* cited by examiner

VELOCITY DEVIATION MEASURING DEVICE AND METHOD

CROSS REFERENCE TO RELATED APPLICATION

This application claims priority under 35 U.S.C. § 119 to Japanese Patent Application No. 2014-137380, filed on Jul. 3, 2014, the entire content of which being hereby incorporated herein by reference.

FIELD OF TECHNOLOGY

The present disclosure relates to a velocity deviation measuring device and method for measuring the deviation of a surface velocity of an object using green movement.

BACKGROUND

In web conveyor devices wherein a roll-shaped physical object such as paper, film, cellophane, metal foil, rubber, or the like (hereinafter termed a "web") is fed out from a feeding portion, specific processes are performed on the web, and the web is then taken up, in a receiving portion, after processing, there have been proposals for the velocity measuring devices for measuring the surface velocity of the web. See, for example, Japanese Unexamined Patent Application Publication No. 2011-141128 (the "JP '128").

When measuring deviations in surface velocity using the technology disclosed in the JP '128, the deviation is calculated from differences in the surface velocity. However, when the difference for which the measurement is attempted is small when compared to the absolute value of the surface velocity, the errors included in the measured values for the surface velocities will be large relative to the difference between the surface velocities, and thus there is a problem in that this reduces the accuracy of the measurement of the deviation.

The JP '128 is a Doppler velocity meter as another velocity measuring device. The Doppler velocity meter is essentially identical to the self-coupling laser sensor disclosed in the JP '128 in the point that a frequency deviation, known as a Doppler shift, that is proportional to the velocity is produced, and thus when the deviation is calculated from the difference between the velocities the same problem as described above will occur.

In addition, Doppler velocity meters, which generally use frequency analysis, such as FFT (Fast Fourier Transforms) have issues such as the following in signal processing. The frequency resolution (velocity resolution) in FFT is determined by the length of the sampling interval, so a long sampling interval is required for high resolution, and, at the same time, it is necessary for the signal frequency to be constant during the sampling interval. The velocity deviation during the sample interval appears as a spreading of the frequency strength peak, and an error results when the power spectrum average does not match the average frequency (velocity) during the sampling interval. The reason for this is that the FFT expresses the average signal strength, rather than expressing the temporal distribution of the primary signal frequency, on the time axis, so that it will be pulled to frequencies wherein the signal strength is strong after application of the window function. Consequently, velocity deviation measurements using FFT have major problems.

Furthermore, because in FFT the number of samples required is determined by the maximum frequency that is subject to analysis and the resolution, the same sampling data are required whether the physical quantity being calculated is the absolute velocity or the velocity deviation. That is, in order to calculate fine deviations in velocity data with a high sampling frequency over a long time window length are required commensurate with the velocity resolution. The calculation overhead required by FFT becomes massive, making it impractical.

Moreover, as a technology related to the JP '128, there is the signal count correcting technology that uses a binary signal for a periodic signal. See, for example, Japanese Unexamined Patent Application Publication No. 2011-033525 (the "JP '525"). This technology disclosed in the JP '525 is a technology that both has an excellent capability for separating signal from noise, and performs signal processing quickly with high accuracy; however, when the signal quality is remarkably poor, so that the signal and noise cannot be separated completely so that the accuracy of the measured value for the velocity is reduced, the error included in the result of the measurement of deviation calculated from the difference between the velocities that include measurement error will be relatively large when compared to the magnitude of deviation, producing a remarkable reduction in the accuracy of measurement of the deviation.

As described above, in the conventional technologies there are problems in that it is difficult to improve the accuracy of measurement of deviation when attempts are made to calculate the deviation in surface velocity from differences in surface velocities of the object.

The present invention was created in order to solve the problems set forth above, and an aspect is to provide a velocity deviation measuring device and method that enables an improvement in the accuracy of measurement of deviation of surface velocities.

SUMMARY

A velocity measuring device according to the present invention includes: a semiconductor laser that emits a laser beam toward an object to be measured; an oscillating wavelength modulator that causes the semiconductor laser to operate so as to alternatingly be in a first oscillating interval wherein the oscillating wavelength continuously increases monotonically and a second oscillating interval wherein the oscillating wavelength continuously decreases monotonically; a detector that detects an electric signal that includes an interference waveform that is produced through the self-coupling effect between the laser beam that is emitted from the semiconductor laser and return light from the object; a binarizing portion that binarizes, synchronized with a sampling clock, the interference waveform that is included in the output signal from the detector; a run length measuring portion that measures a run length of the binary signal when there is a change in a binary signal that is outputted from the binarizing portion in a reference interval and in a comparison interval; a frequency distribution generating portion that generates respective frequency distributions of the run lengths in the reference interval and in the comparison interval from the measurement results by the run length measuring portion; a counting portion that calculates respective total numbers of run lengths at or above a threshold value Th for the reference interval and the comparison interval from the frequency distribution generated by the frequency distribution generating portion; and a calculating portion that calculates a deviation in the surface velocity of the object in the comparison interval, relative to the surface velocity of the object in the reference interval, from the respective counting results by the counting portion in the reference interval and the comparison interval.

Additionally, in one structural example of the velocity deviation measuring device according to the present invention, the threshold value Th is a value that is set in advance.

Additionally, one structural example of the velocity deviation measuring device according to the present invention further includes: a probability calculating portion that calculates a probability p that the output of the binarizing portion will change, from the measurement result of the run length measuring portion in the reference interval; a noise frequency distribution calculating portion that calculates a frequency distribution of noise from the measurement result of the run length measuring portion during the reference interval and the probability p; and a threshold value setting portion that sets, as the threshold value Th, the bin value m wherein the total frequency for noise of bins of value m and above will be a prescribed value, from the calculation result by the noise frequency distribution calculating portion in the reference interval.

Additionally, one structural example of a velocity deviation measuring device according to the present invention further includes: a representative value calculating portion that calculates a representative value T0 for the distribution of the run lengths, from the frequency distribution generated by the frequency distribution generating portion in the reference interval; and a threshold value setting portion that calculates a reference deviation σ for the case wherein the distribution of run lengths in the vicinity of the representative value T0 can be considered to be a normal distribution, from the measurement result by the run length measuring portion in the reference interval, and sets the threshold value Th based on the reference deviation σ and the representative value T0.

A velocity deviation measuring method according to the present invention includes: an oscillating step for causing a semiconductor laser that emits a laser beam toward an object that is subject to measurement to operate so as to alternatingly be in a first emitting interval wherein the oscillating wavelength continuously increases monotonically and a second emitting interval wherein the oscillating wavelength continuously decreases monotonically; a detecting step for detecting an electric signal that includes an interference waveform that is produced through the self-coupling effect between the laser beam that is emitted from the semiconductor laser and return light from the object; a binarizing step for binarizing, synchronized with a sampling clock, the interference waveform that is included in the output signal obtained in the detecting step; a run length measuring step for measuring the binarized run length of the sign when there is a change in the binary signal that is outputted in the binarizing step for a reference interval and a comparison interval respectively; a frequency distribution generating step for generating respective frequency distributions of the run lengths in the reference interval and in the comparison interval from the measurement results by the run length measuring step; a counting step for calculating respective total numbers of run lengths at or above a threshold value Th for the reference interval and the comparison interval from the frequency distribution generated by the frequency distribution generating step; and a calculating step for calculating a deviation in the surface velocity of the object in the comparison interval, relative to the surface velocity of the object in the reference interval, from the respective counting results by the counting steps in the reference interval and the comparison interval.

The present invention enables an improvement in accuracy and repeatability of measurements of deviation in surface velocity through removing the noise component from the run length count result to calculate the deviation of the surface velocity of the object in a comparison interval relative to the surface velocity of the object in a reference interval from the count result from which the noise component has been removed.

BRIEF DESCRIPTIONS OF THE DRAWINGS

DETAILED DESCRIPTION

While the signal counting method disclosed in the JP '525 has an excellent ability to separate the signal from noise, the distribution formed by the noise and the distribution formed by the signal in the frequency distribution are overlapping, so the separation is not perfect. This inability to perfectly separate the signal from noise is the same as for other approaches to measurements, but the signal counting method disclosed in the JP '525 has distinguishing features such as the following:

(A) Noise-shaping effects using statistical effects: The "binarizing procedure and run length frequency distribution generating procedure" in the signal counting method disclosed in the JP '525 have noise-shaping functions that transfer noise across a broad range of frequencies to the high-frequency region; and (B) While the shape of the noise distribution that has been transferred to the high-frequency region will vary greatly depending on the frequency (the count value), the shape of the distribution has high repeatability, and thus it is possible to evaluate quantitatively, for bin values in the frequency distribution, the degree to which the signal and noise have been separated through the noise shaping effects.

From the above, it is to be appreciated that it is possible to achieve higher accuracy and repeatability through a direct calculation of the magnitude of deviation in the surface velocities from a difference in the frequency distributions that include noise than is when calculating the surface velocities using the signal counting method disclosed in the JP '525 and then calculating the deviation in surface velocity from the differences between the surface velocities. While the calculated count value does not express the surface velocity of the object properly, the difference between the signal count values of two different intervals will express the deviation in surface velocities correctly. In the present invention, the deviation of the surface velocity of an object relative to a reference surface velocity is calculated, where an interval for use in comparison, which is prior to the comparison interval for which the deviation in surface velocity is to be calculated, is defined as a reference interval. The mean of the surface velocity of the object during this reference interval is the reference surface velocity. The reference interval and the comparison interval are set by the user, for example.

EXAMPLE

Figure 1:
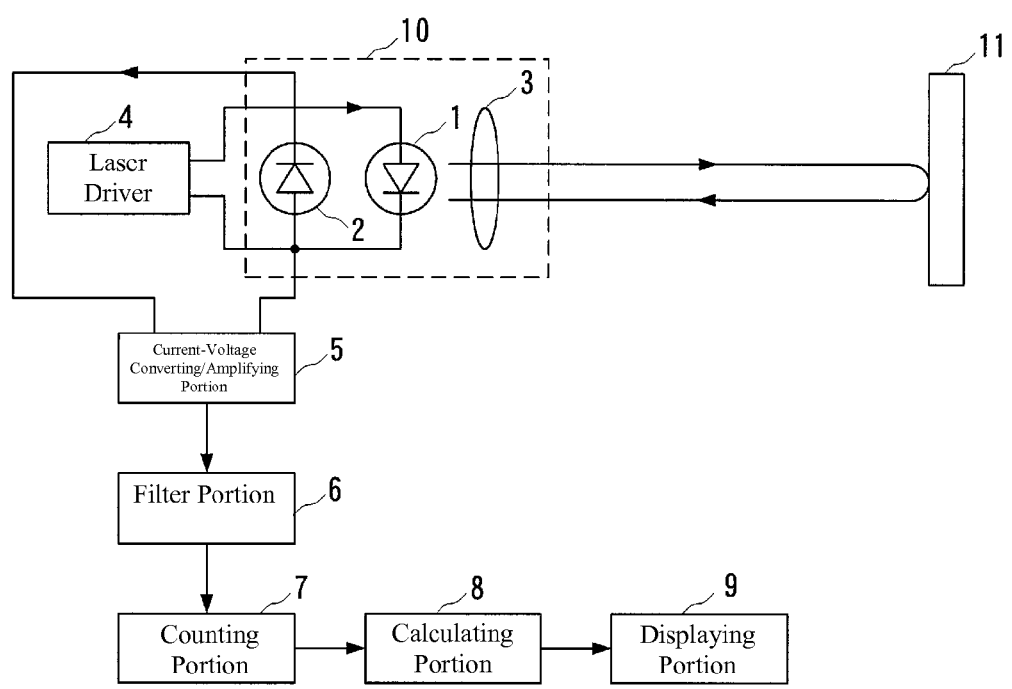
FIG. 1 is a block diagram illustrating the structure of a velocity deviation measuring device according to Example according to the present disclosure.

Forms for carrying out the present disclosure will be explained below in reference to the figures. FIG. 1 is a block diagram illustrating a structure for a velocity deviation measuring device according to Example according to the present disclosure. The velocity deviation measuring device in FIG. 1 includes: a semiconductor laser 1 for emitting a laser beam at a web 11 that is the subject of the measurement; a photodiode 2 for converting the optical power of the semiconductor laser 1 into an electric signal; a lens 3 for focusing and emitting light from the semiconductor laser 1, and for focusing and injecting into the semiconductor laser 1 the return light from the web 11; a laser driver 4 that serves as oscillating wavelength modulator for driving the semiconductor laser 1; a current-voltage converting/amplifying portion 5 for converting the output current from the photodiode 2 into a voltage and for amplifying that voltage; a filter portion 6 for eliminating the carrier wave from the output voltage of the current-voltage converting/amplifying portion 5; a counting portion 7 for counting the number of run lengths of binary signals wherein mode hop pulses (hereinafter termed MHPs) that are the self-coupled signals that are included in the output voltage of the filter portion 6 have been binarized; a calculating portion 8 for calculating the deviation of the surface velocity web 11 in two different time intervals based on the counting result of the counting portion 7; and a displaying portion 9 for displaying the measurement result of the calculating portion 8.

Additionally, the photodiode 2 and the current-voltage converting/amplifying portion 5 structure a detector. The semiconductor laser 1, the photodiode 2, and the lens 3 structure a sensor module 10.

Figure 2:
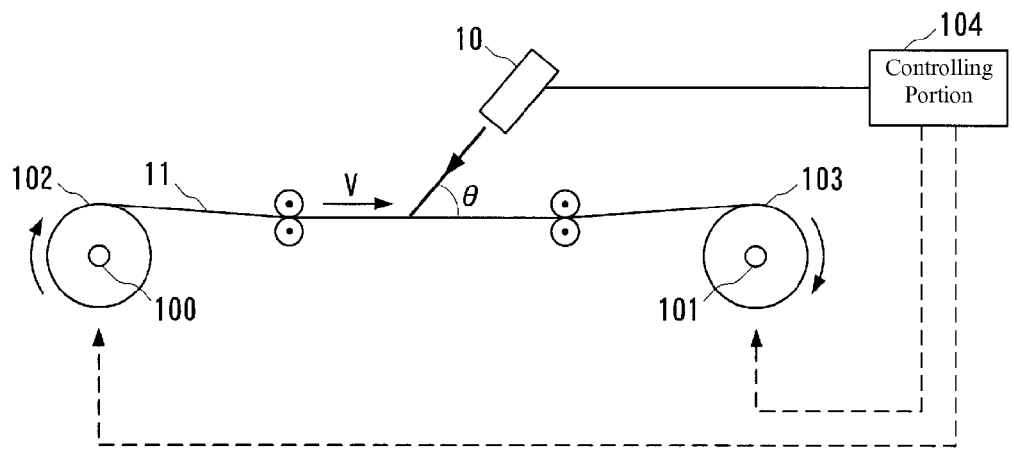
FIG. 2 is a block diagram illustrating the structure of a web conveying device to which is applied the velocity deviation measuring device according to the Example according to the present disclosure.

FIG. 2 is a block diagram illustrating the structure of a web conveying device to which is applied the velocity deviation measuring device according to the Example according to the present disclosure. The web conveying device includes: a sending-side guide shaft 100; a receiving-side guide shaft 101; a sending-side roll 102 that is equipped on the sending-side guide shaft 100; a receiving-side roll 103 that is equipped on the receiving-side guide shaft 101; a sending-side motor driving portion (not shown) for driving the sending-side guide shaft 100 to rotate the sending-side roll 102; a receiving-side motor driving portion (not shown) for driving the receiving-side guide shaft 101 to rotate the receiving-side roll 103; and a controlling portion 104 for controlling the sending-side motor driving portion and the receiving-side motor driving portion.

When the sending-side motor driving portion rotates the sending-side roll 102, the web 11 that is wrapped onto the sending-side roll 102 is fed out. On the receiving side, the receiving-side roll 103 takes up the web 11 by the receiving-side motor driving portion rotating the receiving-side roll 103.

The controlling portion 104 controls the sending-side motor driving portion and the receiving-side motor driving portion in order to cause the velocity of the web 11 to have a desired value.

The sensor module 10 that includes the semiconductor laser 1, the photodiode 2, and the lens 3 is disposed on the web 11 between the sending-side guide shaft 100 and the receiving-side guide shaft 101, as illustrated in FIG. 2, to cause oblique incidence of the laser beam onto the web 11. The oblique incidence of the laser beam is in order to measure the speed of the web 11 along the direction of motion, or in other words, the surface velocity V of the web 11.

The laser driver 4, the current-voltage converting/amplifying portion 5, the filter portion 6, the counting portion 7, the calculating portion 8, and the displaying portion 9 in FIG. 1 are provided within the controlling portion 104, for example.

Note that while in the present example a web 11 is presented as one example of a subject for which the surface velocity deviation is to be measured, there is no limitation thereto, but rather the present invention is applicable to objects other than webs as well.

The operation of the velocity deviation measuring device according to the present example will be explained in detail next. For ease in the explanation, it shall be envisioned below that the semiconductor laser 1 that is used is not of the type that has a mode-hopping phenomenon (the VCSEL type or the DFB laser type).

Figure 3:
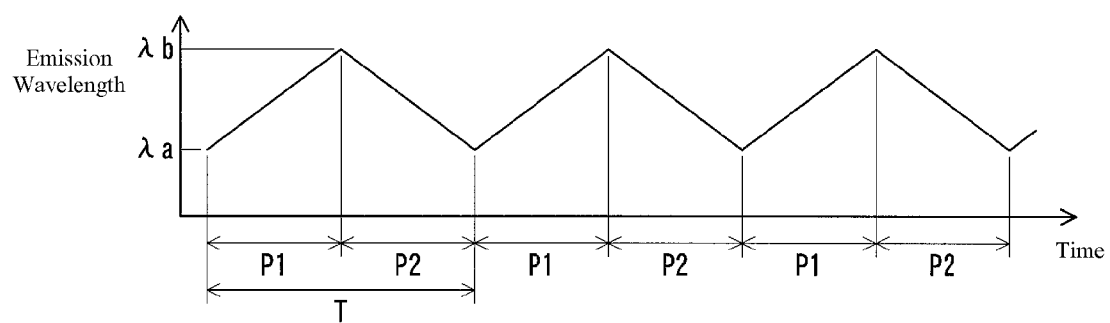
FIG. 3 is a diagram illustrating one example of change over time in the oscillating wavelength of the semiconductor laser in the Example according to the present disclosure.

The laser driver 4 provides, as a driving current to the semiconductor laser 1, a triangle wave driving current that repetitively increases and decreases at a constant rate of change in respect to time. As a result, the semiconductor laser 1 is driven so as to repetitively alternate between a first oscillating interval wherein the oscillating wavelength continuously increases at a constant rate of change, and a second oscillating interval wherein the oscillating wavelength is continuously reduced at a constant rate of change, proportional to the magnitude of the injection current. FIG. 3 is a diagram illustrating the changes in the oscillating wavelength of the semiconductor laser 1 over time. In FIG. 3: P1 is a first emitting interval over which the emission wavelength of a semiconductor laser 1 is continuously and monotonically increasing; P2 is the second emitting interval over which the emission wavelength of the semiconductor laser 1 is continuously and monotonically decreasing; λa is the minimum value for the oscillating wavelength in each interval; λb is the maximum value for the oscillating wavelength in each interval; and T is the period of the triangle wave. In the present example, the maximum value λb of the oscillating wavelength and the minimum value λa of the oscillating wavelength are both always constant, so the difference λb−λa thereof is also always a constant.

The beam that is emitted from the semiconductor laser 1 is focused by the lens 3 to be incident on the web 11. A portion of the beam that is reflected from the web 11 is focused by the lens 3 to be incident on the semiconductor laser 1. Note that the focusing by the lens 3 is not absolutely necessary. The photodiode 2 is disposed within or in the vicinity of the semiconductor laser 1, and converts the optical power from the semiconductor laser 1 into an electric current. The current-voltage converting/amplifying portion 5 converts the output current from the photodiode 2 into a voltage, and then amplifies that voltage.

Figure 4:
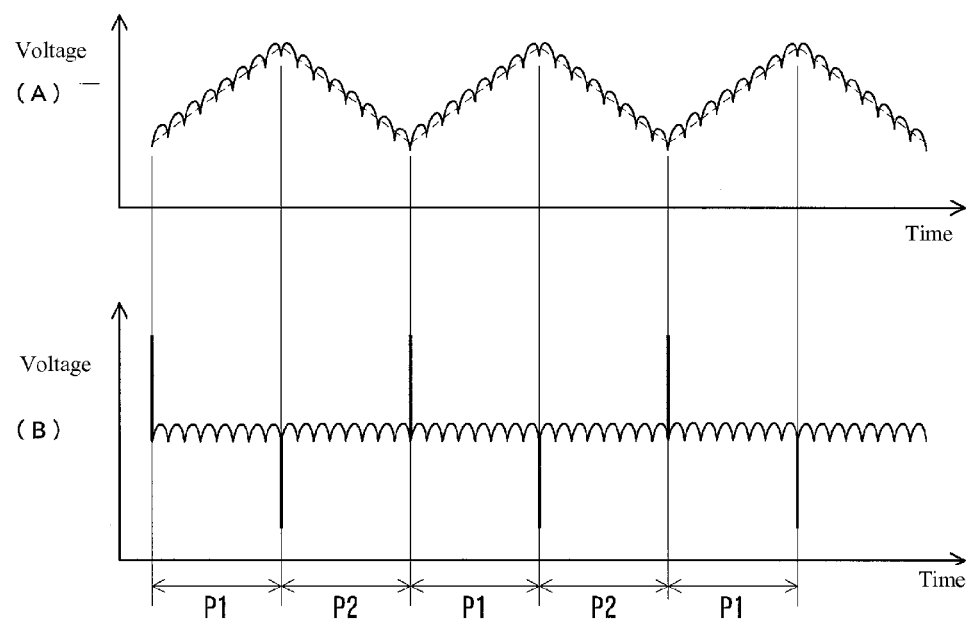
FIG. 4 is a waveform diagram illustrating schematically an output voltage waveform of a current-voltage converting/amplifying portion and an output voltage waveform of a filter portion in the Example according to the present disclosure.

The filter portion 6 has the function of extracting a superimposed signal from a modulated wave. FIG. 4 (A) is a diagram illustrating schematically the output voltage waveform of the current-voltage converting/amplifying portion 5, and FIG. 4 (B) is a diagram illustrating schematically the output voltage waveform of the filter portion 6. These diagrams illustrate the progression of the waveform (the modulated wave) of FIG. 4 (A), which corresponds to the output of the photodiode 2, to the removal of the emitted waveform (the carrier wave) from the semiconductor laser 1 in FIG. 3, to the extraction of the MHP waveform (the interference waveform) of FIG. 4 (B). Note that MHPs, which are a self-coupling signal, are explained in the JP '128 and the JP '525, so detailed explanations thereof will be omitted here.

Figure 5:
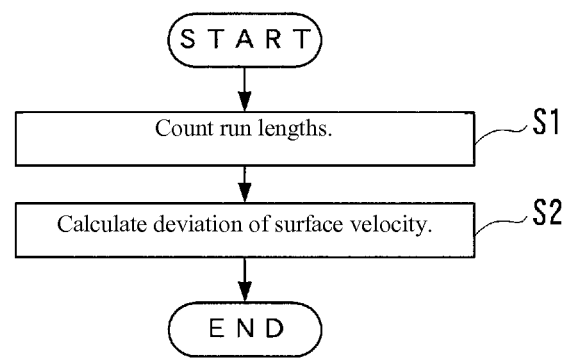
FIG. 5 is a flowchart illustrating the operation of the counting portion and calculating portion in the Example according to the present disclosure.

The operation of the counting portion 7 and the calculating portion 8 will be explained next. FIG. 5 is a flowchart illustrating the operation of the counting portion 7 and the calculating portion 8.

Figure 6:
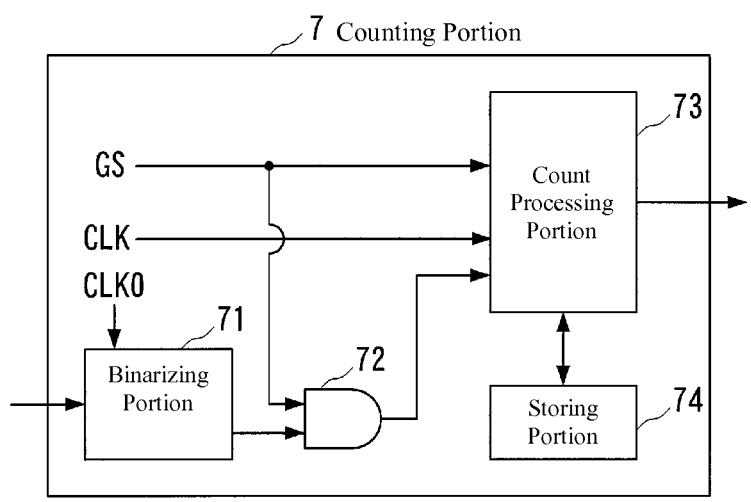
FIG. 6 is a block diagram illustrating one example of a structure of a counting portion in the Example according to the present disclosure.

The counting portion 7 counts the number of run lengths of a binary signal wherein MHPs included in the output voltage of the filter portion 6 have been binarized, doing so separately for the first oscillating period P1 and the second oscillating period P2 (Step S1 in FIG. 5). FIG. 6 is a block diagram illustrating one example of a structure for a counting portion 7. The counting portion 7 is structured from: a binarizing portion 71; a logical product calculating portion (AND gate) 72; a count processing portion 73; and a storing portion 74.

Figure 7:
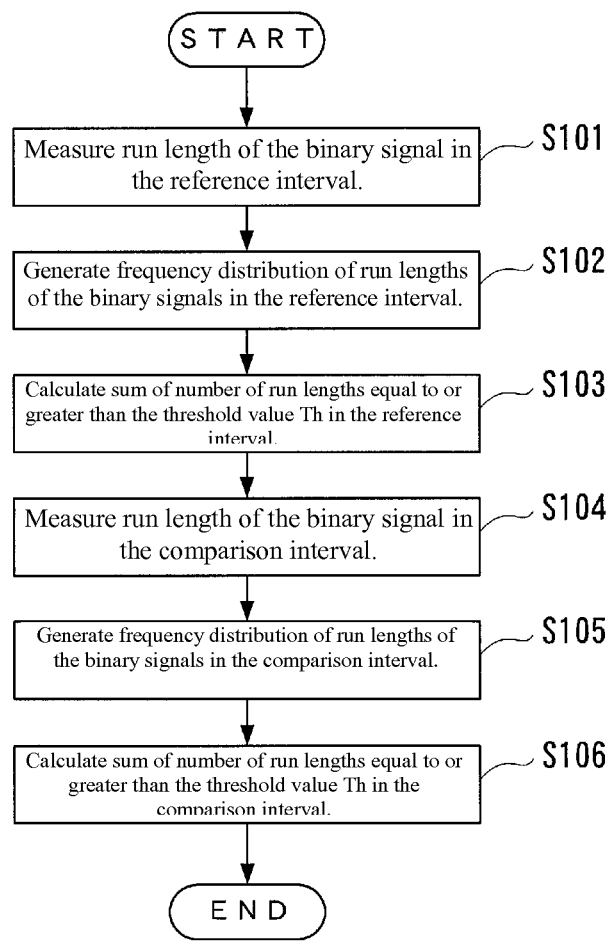
FIG. 7 is a flowchart illustrating the operation of the counting portion in the Example according to the present disclosure.
Figure 8:
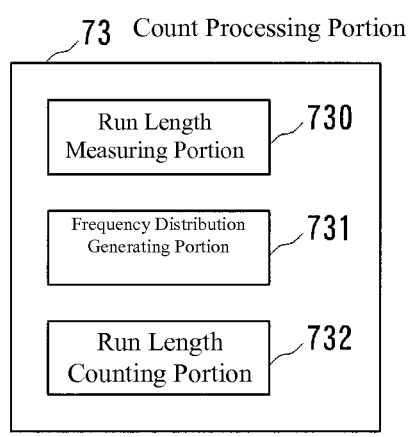
FIG. 8 is a block diagram illustrating one example of a structure of a count processing portion of a counting portion in the Example according to the present disclosure.

FIG. 7 is a flowchart illustrating the operation of the counting portion 7, and FIG. 8 is a block diagram illustrating one example of a structure for the count processing portion 73. The count processing portion 73 is structured from: a run length measuring portion 730; a frequency distribution generating portion 731; and a run length counting portion 732.

Figure 9:
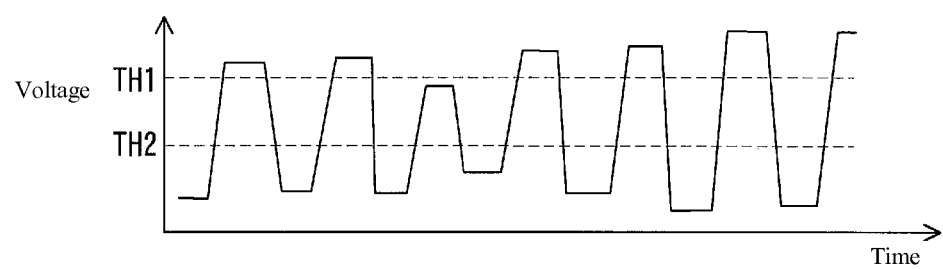
FIG. 9 is a diagram for explaining the operation of the binarizing portion of the counting portion in the Example according to the present disclosure.

FIG. 9 is a diagram for explaining the operation of the binarizing portion 71, a diagram illustrating schematically the waveform of the output voltage of the filter portion 6, which is an MHP waveform.

First the binarizing portion 71 of the counting portion 7 evaluates whether the output voltage of the filter portion 6 illustrated in FIG. 9 is at the high level (H) or at the low level (L), and outputs the evaluation result. At this time, the binarizing portion 71 performs an evaluation synchronized with the sampling clock CLK0, to evaluate to a high level if the output voltage of the filter portion 6 is at or above the threshold value TH1 at the rising edge of the sampling clock CLK0, for example, to evaluates to a low-level if the output voltage of the children portion 6 is at or below the threshold value TH2 (where TH2<TH1) at the rising edge of the sampling clock CLK0, and to maintain the same output level as at the rising edge of the immediately previous sampling clock CLK0 if, at the rising edge of the sampling clock CLK0, the output voltage of the filter portion 6 is less than the threshold value TH1 and greater than the threshold value TH2. In this way, the binarizing portion 71 binarizes the output of the filter portion 6 synchronized with the sampling clock CLK0. The frequency of the sampling clock CLK0 must be a frequency that is adequately high when compared to the maximum frequency that is possible for the MHPs (for example, a frequency that is 20 times the frequency of the MHPs).

The AND gate 72 outputs the result of a logical product calculation of the output of the binarizing portion 71 and the gate signal GS. Here the gate signal GS is a signal that rises at the beginning of the counting interval (which, in the present example, is either the first oscillating interval P1 or the second oscillating interval P2), and falls when the counting interval is over.

Figure 10:
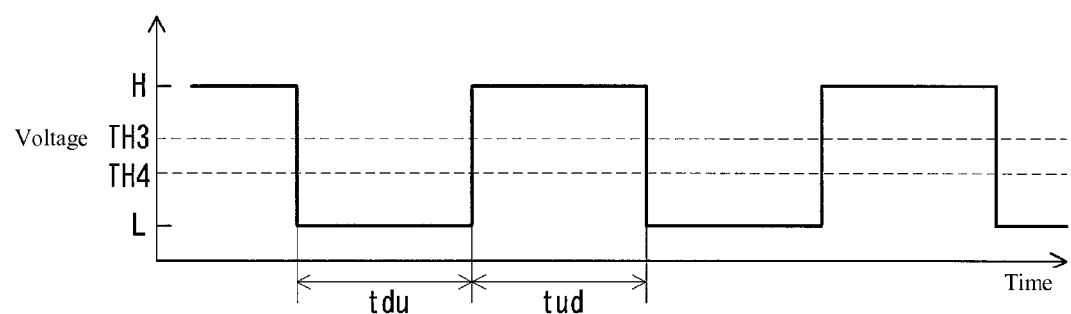
FIG. 10 is a diagram for explaining the operation of the run length measuring portion of the counting portion in the Example according to the present disclosure.

FIG. 10 is a diagram for explaining the operation of the run length measuring portion 730 of the count processing portion 73. The run length measuring portion 730 measures the run length of a binary signal wherein the MHPs during the counting interval of a reference interval have been binarized (Step S101 in FIG. 7). That is, the run length measuring portion 730 compares the output of the AND gate 72 during the counting interval to a threshold value TH3, to detect the rising edge of the output of the AND gate 72, and compares the output of the AND gate 72 to a threshold value TH4 (where TH4<TH3), to detect the following edge of the output of the AND gate 72. Following this, the run length measuring portion 730 measures the time tud from the rising edge to the next falling edge of the output of the AND gate 72, and measures the time tdu from the falling edge to the next rising edge of the output of the AND gate 72, to measure the run length of the output of the AND gate 72 during the counting interval. In this way, the run length is the time tud or tdu. In the run length measuring portion 730 the measurement, such as described above, is performed each time either a rising edge or a falling edge of the AND gate 72. The run length measuring portion 730 carries out the measurements such as described above in both the first oscillating interval P1 and the second oscillating interval P2 within the reference interval.

Note that the run length measuring portion 730 measures the run length of the binary signal in units of cycles of a sampling clock CLK. For example if the run length of the binary signal is twice the sampling clock, then the magnitude of the run length is 2 (samplings). The frequency of the sampling clock CLK is adequately high relative to the maximum frequency that may be assumed by the MHPs (CLK>CLK0).

The storing portion 74 stores the measurement result of the run length measuring portion 730.

Figure 11:
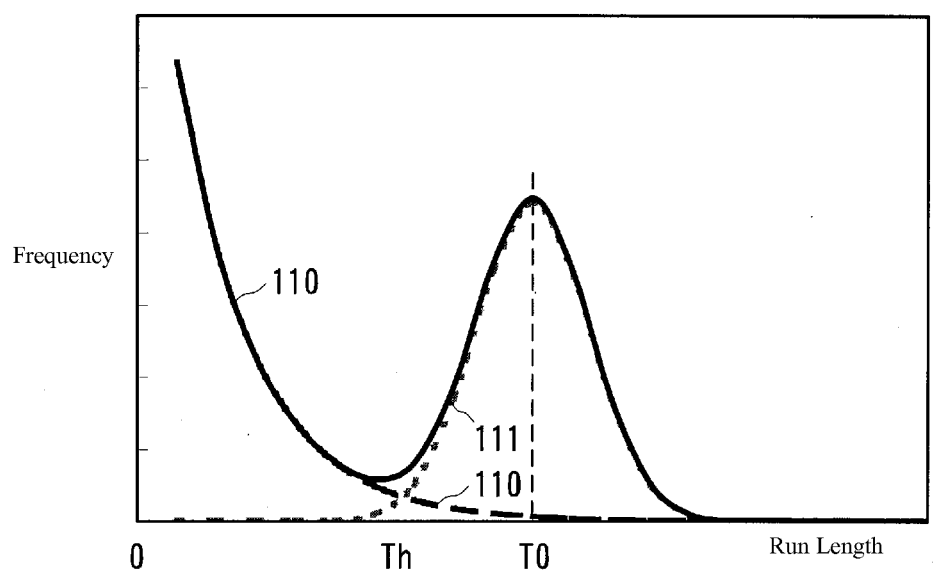
FIG. 11 is a diagram illustrating an example of a run length frequency distribution.

The frequency distribution generating portion 731 of the count processing portion 73 generates frequency distributions for the run lengths tud and tdu of the binary signal from the measurement results of the run length measuring portion 730 that are stored in the storing portion 74 during the reference interval (Step S102 in FIG. 7). FIG. 11 is a diagram illustrating an example of a run length frequency distribution of the binary signal. The frequency distribution generating portion 731 carries out the generation of run length frequency distributions such as described above in both the first oscillating interval P1 and the second oscillating interval P2 within the reference interval.

The run length counting portion 732 of the count processing portion 73 calculates a sum N of the numbers of the run lengths tud and tdu that are equal to or greater than a threshold value Th, from the frequency distribution generated by the frequency distribution generating portion 731 during the reference interval (Step S103 in FIG. 7). The run length counting portion 732 carries out the counting of the run lengths tud and tdu that are equal to or greater than the threshold value Th, such as described above, in both the first oscillating interval P1 and the second oscillating interval P2 within the reference interval.

Following this, the run length measuring portion 730 measures, in the same way as in Step S101, the run length of a binary signal wherein the MHPs during the counting interval of a comparison interval have been binarized (Step S104 in FIG. 7). The run length measuring portion 730 carries out the measurements such as described above in both the first oscillating interval P1 and the second oscillating interval P2 within the comparison interval. The storing portion 74 stores the measurement result of the run length measuring portion 730.

In the same manner as in Step S102, the frequency distribution generating portion 731 of generates frequency distributions for the run lengths tud and tdu of the binary signal from the measurement results of the run length measuring portion 730 that are stored in the storing portion 74 during the comparison interval (Step S105 in FIG. 7). The frequency distribution generating portion 731 carries out the generation of run length frequency distributions such as described above in both the first oscillating interval P1 and the second oscillating interval P2 during the comparison interval.

The run length counting portion 732 calculates a sum N of the numbers of the run lengths tud and tdu that are equal to or greater than a threshold value Th, from the frequency distribution generated by the frequency distribution generating portion 731 during the comparison interval (Step S106 in FIG. 7). The run length counting portion 732 carries out the counting of the run lengths tud and tdu that are equal to or greater than the threshold value Th, such as described above, in both the first oscillating interval P1 and the second oscillating interval P2 during the comparison interval.

The run lengths of the binary signal wherein the MHPs have been binarized form a normal distribution centered on T0, as illustrated in FIG. 11, where the noise component that is superimposed on the binary signal forms a geometric distribution. The success rate p in the geometric distribution is determined by the width of the hysteresis threshold values in the binarizing procedure and on the amplitude of the noise. The superimposed noise component is stable, independent of the deviation in the surface velocity of the web 11, and thus even though there is variability in the frequency, the distribution is constant. In order to calculate the surface velocity of the web 11, it is necessary to divide the frequency distribution illustrated in FIG. 11 into a noise component (110 in FIG. 11) and a signal component (111 in FIG. 11), but there will be error in the calculated value for the surface velocity when there are bins wherein the distributions overlap.

However, when calculating the deviation in the surface velocity it is not strictly necessary to separate the noise and signal distributions, and thus it is possible to calculate the deviation in surface velocities from the differences in the distribution in a state that includes a portion that is a distribution that is formed by noise. The distribution that is formed by noise has a shape that is stable, but there is large variation in the frequencies (the count values), and thus the calculation is through a distribution that excludes those short time the ends wherein the variability is large. Given this, in the present example the numbers of run lengths that are less than a threshold value Th are excluded. The threshold value Th may be set in advance from, for example, the signal band.

Figure 12:
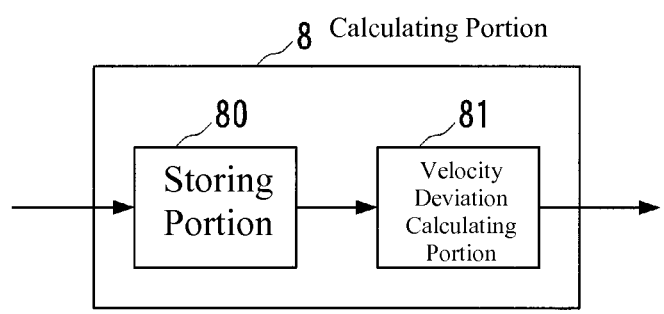
FIG. 12 is a block diagram illustrating one example of a structure of a calculating portion in the Example according to the present disclosure.

The calculating portion 8 then calculates the deviation of the surface velocity of the web 11 based on the number of run lengths counted by the counting portion 7 (Step S2 in FIG. 5). FIG. 12 is a block diagram illustrating one example of a structure for a calculating portion 8. The calculating portion 8 is structured from a storing portion 80 for storing the counting result by the counting portion 7, and a velocity deviation calculating portion 81 for calculating the deviation in the surface velocity of the web 11 from the counting result of the counting portion 7.

The counting result of the counting portion 7 is stored in the storing portion 80 of the calculating portion 8. The velocity deviation calculating portion 81 of the calculating portion 8 uses the following equation to calculate the deviation $\Delta V$ of the surface velocity V of the web 11 during the comparison interval, relative to the reference surface velocity of the web 11 during the reference interval, from the counting result from the counting portion 7, the average wavelength $\lambda$ of emission of the semiconductor laser 1, the angle $\theta$ formed between the optical axis of the laser beam from the semiconductor laser 1 and the direction of movement of the web 11, and the period T of the carrier wave (the triangle wave) for modulating the wavelength emitted by the semiconductor laser 1:

$$\Delta V = [(N'u_1 - N'd_1) - (N'u_0 - N'd_0)] \times (\lambda/2T)/\cos\theta \quad (1)$$

In the this Equation 1, $N'u_0$ is the total number of run lengths that are greater than the threshold value Th in the first emission interval P1 during the reference interval, $N'd_0$ is the total number of run lengths that are greater than the threshold value Th in the second emission interval P2 during the reference interval, $N'u_1$ is the total number of run lengths that are greater than the threshold value Th in the first emission interval P1 during the comparison interval, $N'd_1$ is the total number of run lengths that are greater than the threshold value Th in the second emission interval P2 during the comparison interval. Note that a plurality of first emission intervals P1 and a plurality of second emission intervals P2 are included in the reference interval, and, similarly, a plurality of first emission intervals P1 and a plurality of second emission intervals P2 are included in the comparison interval. Consequently, strictly speaking, $N'u_0$ is the average of the total numbers of run lengths that are greater than the threshold value Th in multiple first emission intervals P1 during the reference interval, $N'd_0$ is the average of the total numbers of run lengths that are greater than the threshold value Th in multiple second emission intervals P2 during the reference interval, $N'u_1$ is the average of the total numbers of run lengths that are greater than the threshold value Th in multiple first emission intervals P1 during the comparison interval, N'd$_1$ is the average of the total numbers of run lengths that are greater than the threshold value Th in multiple second emission intervals P2 during the comparison interval.

In this way it is possible to calculate the deviation ΔV between the surface velocities V between two different intervals. The displaying portion 9 displays the deviation ΔV of the surface velocity V of the web 11, calculated by the velocity deviation calculating portion 81.

As described above, the present example enables an improvement in the measurement accuracy and repeatability of the deviation ΔV of the surface velocity V through excluding the noise component from the result of counting run lengths and then calculating the deviation ΔV of the surface velocities V of the web 11 from the counting results from which the noise component has been removed.

Another Example

Another Example according to the present disclosure will be explained next. In the present example, a geometric distribution that is highly correlated with the distribution that is formed by the run lengths for the binarized noise in the reference interval is calculated, and the threshold value Th is calculated from this geometric distribution. Because the structure of the velocity deviation measuring device in the present example is identical to that of the Example, the explanation will use the codes in FIG. 1, FIG. 2, and FIG. 6.

Figure 13:
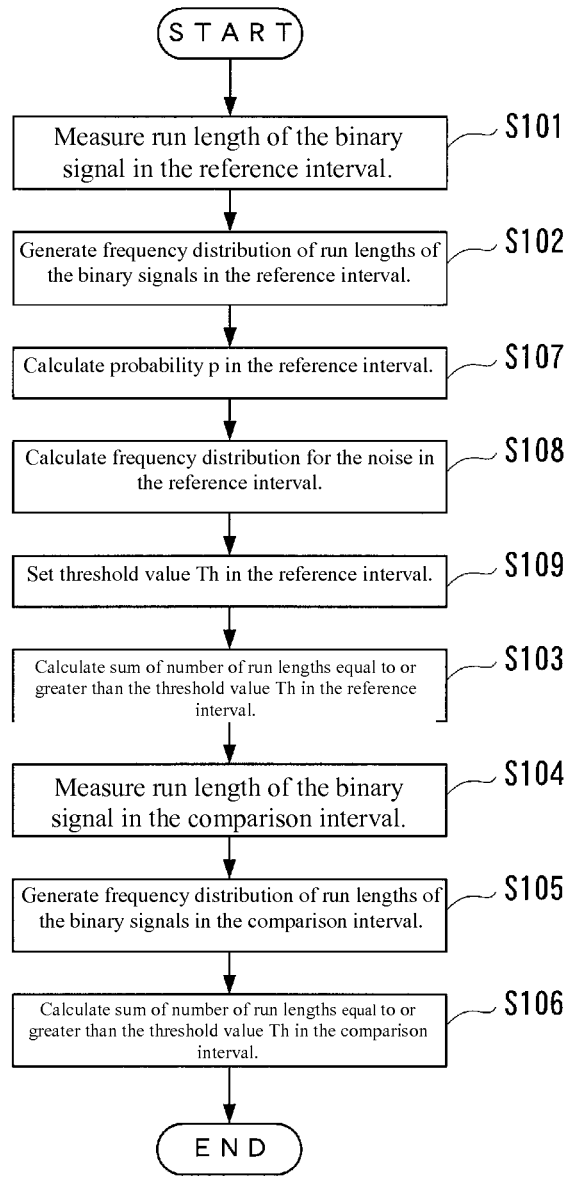
FIG. 13 is a flowchart illustrating the operation of a counting portion in Another Example according to the present disclosure.
Figure 14:
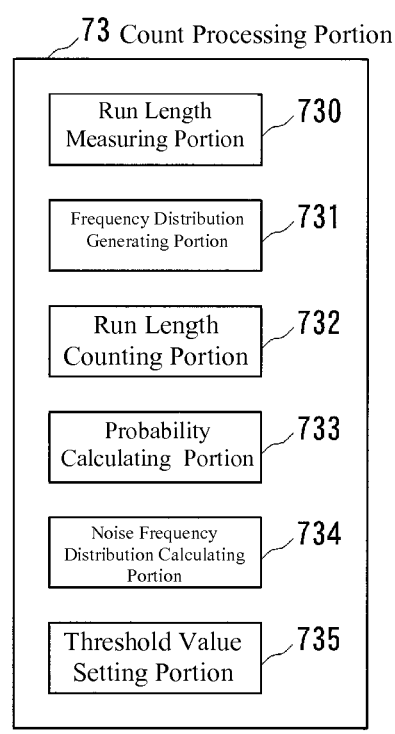
FIG. 14 is a block diagram illustrating one example of a structure of a count processing portion of a counting portion in the Another Example according to the present disclosure.

FIG. 13 is a flowchart illustrating the operation of the counting portion 7 in the present example, and FIG. 14 is a block diagram illustrating one example of a structure for the count processing portion 73 in the present example. The count processing portion 73 in the present example is structured from a run length measuring portion 730, a frequency distribution generating portion 731, a run length counting portion 732, a probability calculating portion 733, a noise frequency distribution calculating portion 734, and a threshold value setting portion 735.

The processes in Step S101 and S102 of FIG. 13 are as were explained using FIG. 7 in the Example.

Figure 15:
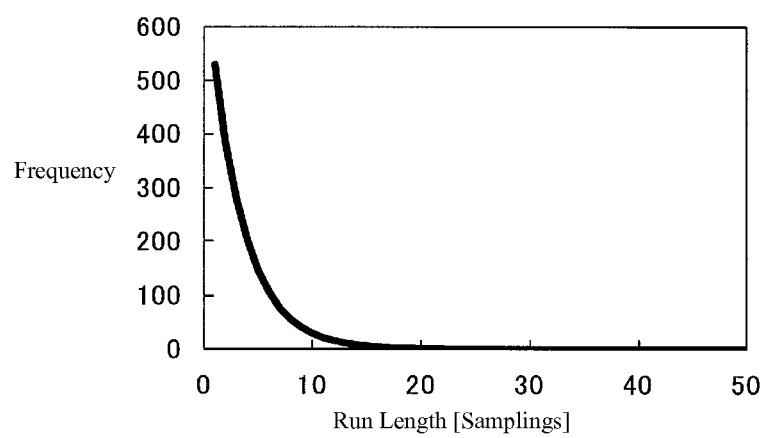
FIG. 15 is a diagram illustrating an example of a run length frequency distribution in a non-signal state.

An example of the frequency distribution of the run lengths that are measured by the run length measuring portion 730 if there is no MHP (if there is no object in front of the semiconductor laser 1, or if the object is too far away, outside of the detectable range, so as to not be detected), that is, if in a non-signal state, is shown in FIG. 15. The run length frequency distribution in the non-signal state follows a geometric distribution $F_{edge}(x)$ according to Equation (2), because it follows Bernoulli's theory, which is the probability theory of discrete time.

$$F_{edge}(x) = p \cdot (1-p)^{x-1} \quad (2)$$

Figure 16:
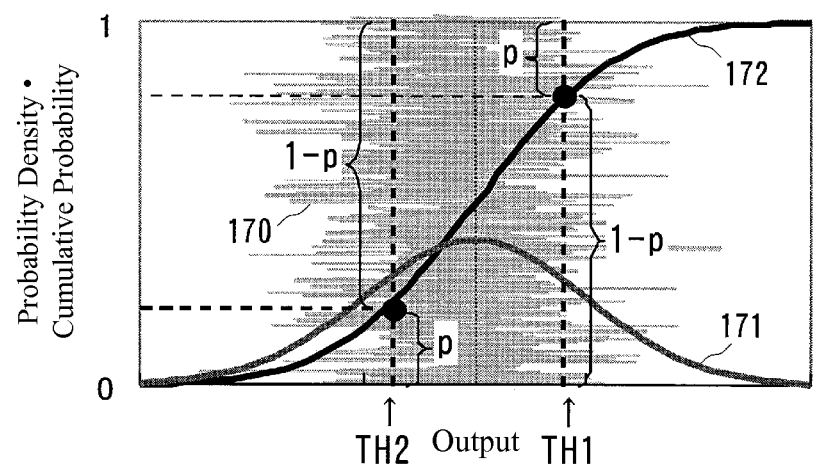
FIG. 16 is a diagram for explaining regarding the probability that the sign will change and the probability that the sum will not change after binarization.

Equation (2) is explained below. In discrete time probability theory, the probability of success/failure can be expressed as a series of Bernoulli trials that have no time dependency. If there is no MHP, then that which is outputted from the filter portion 6 can be defined as white noise that has no time dependency. When white noise is binarized and the average value of the white noise is essentially equal to the center between the threshold values for TH1 and TH2, then, as illustrated in FIG. 16, if the probability of a transition in the sign after authorization from a low level to a high level or a high level to a low level is defined as p, then the probability that there will be no change in sign can be defined as 1−p. The case wherein the sign after binarization changes shall be termed "success" and the case wherein there is no change in sign shall be termed "failure." The horizontal axis in FIG. 16 is the output of the filter portion 6, where 170 represents white noise, 171 represents the probability density, and 172 represents the cumulative probability. The probability that the same sign will continue x times is the probability of x−1 failures and 1 successes, and thus can be expressed by Equation (2), above.

The probability p that the sign after binarization will change can be calculated from the relationship in Equation (2). When the frequency of a specific bin value (which, in the present example, is then value 1 (samplings)) is defined as N1 and the total number of sampling clocks (CLK) during the evaluation interval is defined as Nsamp, the probability p that the sign after binarization will change can be calculated as in the following equation:

$$p = \sqrt{(N1/Nsamp)} = (N1/Nsamp)^{1/2} \quad (3)$$

Note that the prescribed bin value is, theoretically, the bin value 1, but in some cases the frequency for the bin value 1 may be attenuated by the effect of a low-pass filter included in the circuitry. In such cases, another bin value, near to the bin value 1, may be used as the prescribed bin value.

The probability calculating portion 733 of the count processing portion 73 calculates the frequency $N_1$ of the specific bin value during the reference interval from the measurement results by the run length measuring portion 730, which are stored in the storing portion 74, and calculates the probability p of a change in sign after binarization from Equation (3) using this frequency $N_1$ and the total number of sampling clocks (CLK) Nsamp during the reference interval (Step S107 in FIG. 13). The calculation of results by the probability calculating portion 733 are stored in the storing portion 74.

Note that because the method for calculating the probability p using Equation (3) assumes that there is no object in front of the semiconductor laser 1, it cannot be applied to the case wherein there is an object in front of the semiconductor laser. Consequently, for the actual method, the probability p may be calculated through the probability calculating portion 733 changing the code after binarizing using the curve fitting of Equation (2) from the result of measurement by the run length measuring portion 730 that is stored in the storing portion 74 (Step S107). Moreover, another method for calculating the probability p may be used instead.

Following this, the noise frequency distribution calculating portion 734 of the count processing portion 73 calculates the noise frequency distribution (Step S108 in FIG. 13). From the relationship in Equation (2), the noise frequency N(m) of bin value m (samplings) during the preference interval can be calculated as in the following equation:

$$N(m) = Nsamp \cdot p^2 \cdot (1-p)^{m-1} \quad (4)$$

Note that the total frequency EN(m) of the noise at this time is Nsamp·p.

The noise frequency distribution calculating portion 734 calculates the frequency N(m) of the noise for the bin value m (samplings) during the reference interval from the measurement results by the run length measuring portion 730, stored in the storing portion 74. The noise frequency distribution calculating portion 734 performs this calculation for the frequency N(m) for each of the bin values from bin value 1 through the maximum bin value (the maximum period in the measurement results by the run length measuring portion 730).

Moreover, the threshold value setting portion 735 of the count processing portion 73 sets, as the threshold value Th, the bin value m (run length) wherein the sum of the frequency of the noise for the bin values of m and above reaches a prescribed value, from the result calculated from the noise frequency distribution calculating portion 734 during the reference interval (Step S109 in FIG. 13).

The processes in Step S103 through S106 of FIG. 13 are as were explained using FIG. 7 in the Example. Given this, the present example enables removal of high frequency noise components through establishing the threshold value Th.

Yet Another Example

Yet Another Example according to the present disclosure will be explained next. In the present example, the threshold value Th is determined from the shape of the distribution in the vicinity of a representative value T0 during the reference interval. Because the structure of the velocity deviation measuring device in the present example is identical to that of the Example, the explanation will use the codes in FIG. 1, FIG. 2, and FIG. 6.

Figure 17:
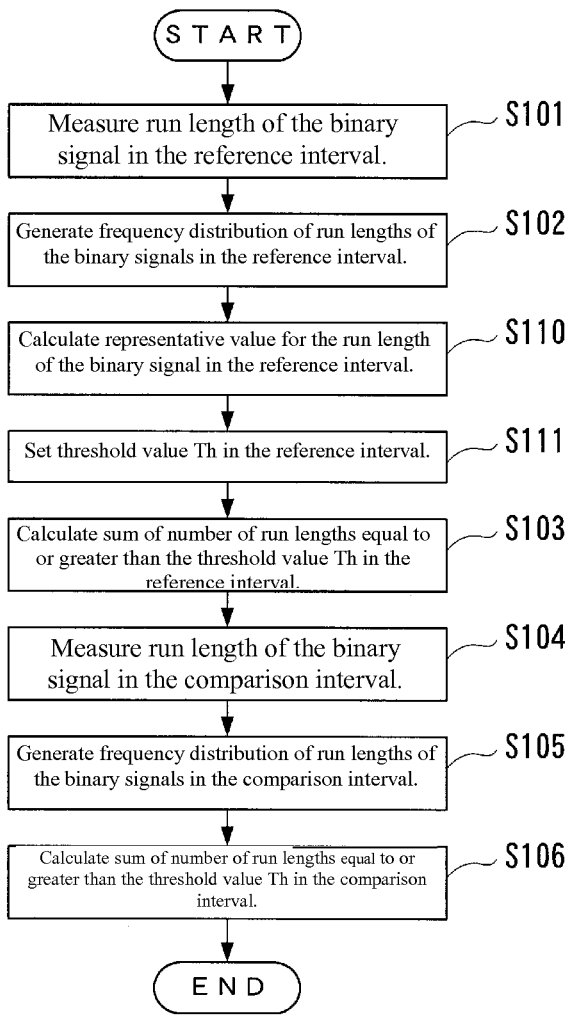
FIG. 17 is a flowchart illustrating the operation of a counting portion in Yet Another Example according to the present disclosure.
Figure 18:
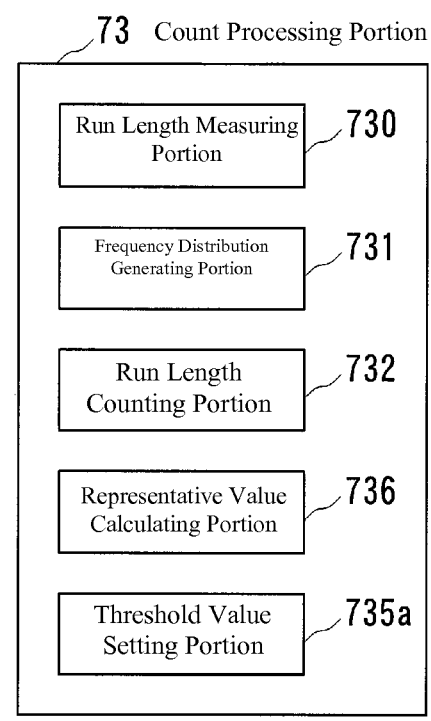
FIG. 18 is a block diagram illustrating one example of a structure of a count processing portion of a counting portion in the Yet Another Example according to the present disclosure.

FIG. 17 is a flowchart illustrating the operation of the counting portion 7 in the present example, and FIG. 18 is a block diagram illustrating one example of a structure for the count processing portion 73 in the present example. The count processing portion 73 according to the present example is structured from: a run length measuring portion 730; a frequency distribution generating portion 731; a run length counting portion 732; a threshold value setting portion 735a, and a representative value calculating portion 736.

The processes in Step S101 and S102 of FIG. 17 are as were explained using FIG. 7 in the Example.

The representative value calculating portion 736 of the count processing portion 73 calculates representative value T0 for the distributions the binary signal run lengths tud and tdu, from the frequency distributions generated by the frequency distribution generating portion 731 during the reference interval (Step S110 in FIG. 17). Here the mode or median of the run length of the binary signal may be used as the representative value T0. Given this, the representative value calculating portion 736 may define, as the representative value T0, the bin value that has, among the frequency distribution of the run length of the binary signals, the greatest product of the bin value (the run length), on the horizontal axis, multiplied by the count thereof on the vertical axis. The T0 that is calculated by the representative value activating portion 736 is stored in the storing portion 74. Note that the frequency distribution generating portion 731 generates the respective frequency distributions for the first emission interval P1 and the second emission interval P2 during the reference interval, and the representative value calculating portion 736 may calculate a representative value T0 from a signal frequency distribution that combines the frequency distribution during the first emission interval P1 and the frequency distribution during the second emission interval P2.

The threshold value setting portion 735a of the count processing portion 73 calculates a reference deviation σ for the case wherein the distribution of the run lengths in the vicinity of the representative value T0 can be considered to be a normal distribution, from the measurement result by the run length measuring portion 730 that is stored in the storing portion 74 during the reference interval, and then sets the threshold value Th according to the following equation based on the reference deviation σ and the representative value T0 calculated by the representative value calculating portion 736 (Step S111 in FIG. 17):

$$Th = T0 - a\sigma \quad (5)$$

The coefficient a is a positive real number that is set in advance.

The processes in Step S103 through S106 of FIG. 17 are as were explained using FIG. 7 in the Example. In this way, the present example enables the threshold value Th to be determined from the shape of the distribution in the vicinity of the representative value T0.

Note that while in the Example, Another Example and Yet Another Example the explanations used a web 11 as an example of the subject for the measurement of the deviation of the surface velocity, there is no limitation thereto, but rather the present invention can be applied to objects other than webs as well.

Additionally, in the Example, Another Example and Yet Another Example, the counting portion 7 and the calculating portion 8 may be achieved through, for example, a computer that is provided with a CPU (Central Processing Unit), a storage device, and an interface, and through a program that controls these hardware resources. The program for operating such a computer is provided in a state that is stored on a storage medium such as a floppy disk, a CD-ROM, a DVD-ROM, a memory card, or the like. A CPU writes to a storage device a program that has been read in, to thereby carry out the processes described in the Example, Another Example and Yet Another Example following the program that has been stored in the storing device.

The present invention can be applied to technologies for measuring deviation in surface velocities.

The invention claimed is:

1. A velocity deviation measuring device, comprising:
a semiconductor laser that emits a laser beam toward an object to be measured;
an oscillating wavelength modulator that causes the semiconductor laser to operate so as to alternatingly be in a first oscillating interval in which an oscillating wavelength continuously increases monotonically and a second oscillating interval in which the oscillating wavelength continuously decreases monotonically;
a detector that detects an electric signal that includes an interference waveform that is produced through a self-coupling effect between the laser beam that is emitted from the semiconductor laser and return light from the object;
a binarizing portion that binarizes, synchronized with a sampling clock, the interference waveform that is included in an output signal from the detector;
a run length measuring portion that measures a run length of a binary signal when there is a change in the binary signal that is outputted from the binarizing portion in a reference interval and in a comparison interval;
a frequency distribution generating portion that generates respective frequency distributions of run lengths in the reference interval and in the comparison interval from measurement results of the run length measuring portion;
a counting portion that calculates respective total numbers of run lengths at or above a threshold value Th for the reference interval and the comparison interval from the frequency distribution generated by the frequency distribution generating portion; and
a calculating portion that calculates a deviation in a surface velocity of the object in the comparison interval, relative to a surface velocity of the object in the reference interval, from respective counting results by the counting portion in the reference interval and the comparison interval.

2. The velocity deviation measuring device as set forth in claim 1, wherein:
the threshold value Th is a value that is set in advance.

3. The velocity deviation measuring device as set forth in claim 1, further comprising:
a probability calculating portion that calculates a probability p that an output of the binarizing portion will change, from the measurement results of the run length measuring portion in the reference interval;
a noise frequency distribution calculating portion that calculates a frequency distribution of noise from the measurement results of the run length measuring portion during the reference interval and the probability p; and
a threshold value setting portion that sets, as the threshold value Th, a bin value in wherein a total frequency for noise of bins of value in and above will be a prescribed value, from a calculation result of the noise frequency distribution calculating portion in the reference interval.

4. The velocity deviation measuring device as set forth in claim 1, further comprising:
a representative value calculating portion that calculates a representative value T0 for the distribution of the run lengths, from the frequency distribution generated by the frequency distribution generating portion in the reference interval; and
a threshold value setting portion that calculates a reference deviation σ for a case wherein the distribution of run lengths in a vicinity of the representative value T0 is considered to be a normal distribution, from a measurement result of the run length measuring portion in the reference interval, and sets the threshold value Th based on the reference deviation σ and the representative value T0.

5. A velocity deviation measuring method, comprising:
an oscillating step of causing a semiconductor laser that emits a laser beam toward an object that is subject to measurement to operate so as to alternatingly be in a first emitting interval in which an oscillating wavelength continuously increases monotonically and a second emitting interval in which the oscillating wavelength continuously decreases monotonically;
a detecting step of detecting an electric signal that includes an interference waveform that is produced through a self-coupling effect between the laser beam that is emitted from the semiconductor laser and return light from the object;
a binarizing step of binarizing, synchronized with a sampling clock, the interference waveform that is included in an output signal obtained in the detecting step;
a run length measuring step of measuring the binarized run length of a sign when there is a change in a binary signal that is outputted in the binarizing step for a reference interval and a comparison interval respectively;
a frequency distribution generating step of generating respective frequency distributions of run lengths in the reference interval and in the comparison interval from measurement results of the run length measuring step;
a counting step of calculating respective total numbers of run lengths at or above a threshold value Th for the reference interval and the comparison interval from the frequency distribution generated in the frequency distribution generating step; and
a calculating step of calculating a deviation in a surface velocity of the object in the comparison interval, relative to a surface velocity of the object in the reference interval, from respective counting results in the counting step in the reference interval and the comparison interval.

6. The velocity deviation measuring method as set forth in claim 5, wherein:
the threshold value Th is a value that is set in advance.

7. The velocity deviation measuring method as set forth in claim 5, further comprising:
a probability calculating step of calculating a probability p that an output of the binarizing step will change, from the measurement results of the run length measuring step in the reference interval;
a noise frequency distribution calculating step of calculating a frequency distribution of noise from the measurement results of the run length measuring step during the reference interval and the probability p; and
a threshold value setting step of setting, as the threshold value Th, a bin value m wherein a total frequency for noise of bins of value m and above will be a prescribed value, from a calculation result of the noise frequency distribution calculating step in the reference interval.

8. The velocity deviation measuring method as set forth in claim 5, further comprising:
a representative value calculating step of calculating a representative value T0 for the distribution of the run lengths, from the frequency distribution generated by the frequency distribution generating step in the reference interval; and
a threshold value setting step of calculating a reference deviation σ for a case wherein the distribution of run lengths in a vicinity of the representative value T0 is considered to be a normal distribution, from a measurement result of the nm length measuring step in the reference interval, and setting the threshold value Th based on the reference deviation σ and the representative value T0.

* * * * *